May 5, 1959 J. SANCHIS 2,885,127
LIQUID DISPENSING DEVICE
Filed Nov. 16, 1956
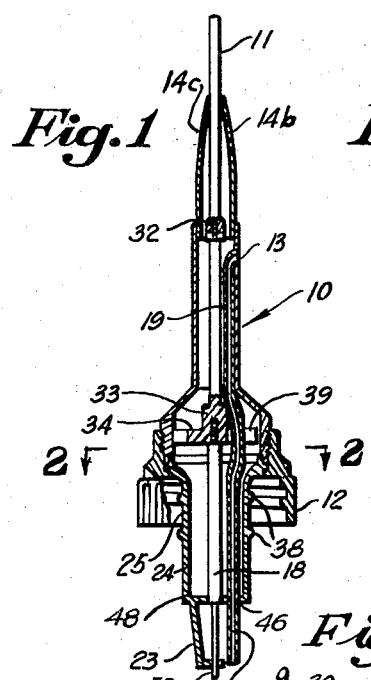
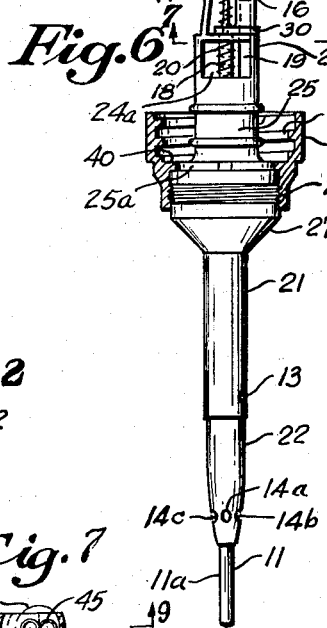
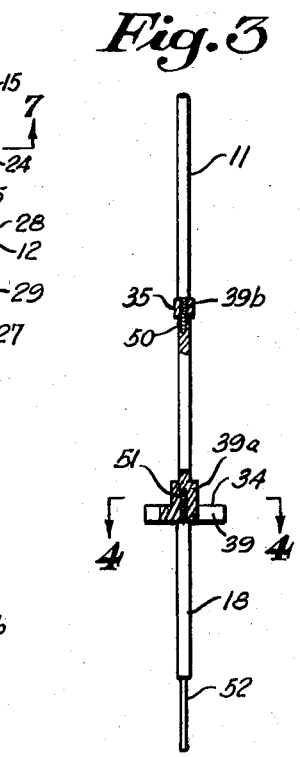
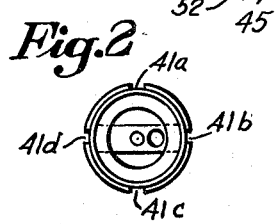
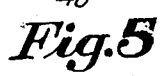
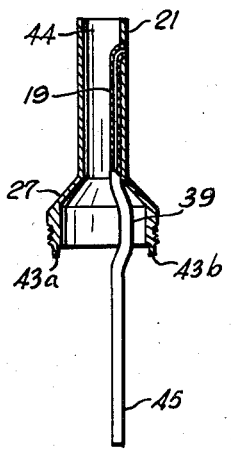
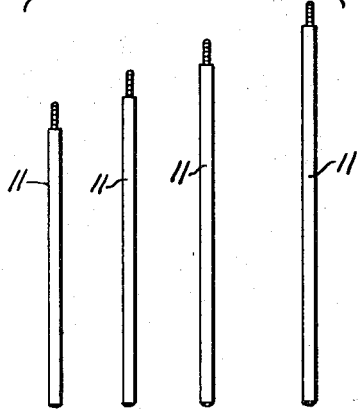
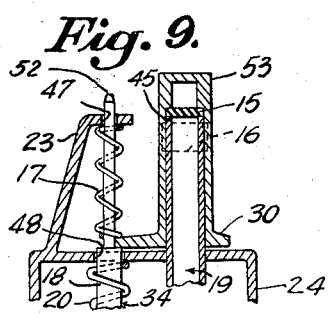
INVENTOR.
JOSE SANCHIS
BY Richards & Geier
ATTORNEYS though the opening 46 of the uppermost portion of the sleeve member 25 as shown in Figure 7 and firmly held in position by means of the integrally formed intermediate sleeve member 24 having an opening 24a.
United States Patent Office

2,885,127
Patented May 5, 1959

2,885,127

LIQUID DISPENSING DEVICE

Jose Sanchis, Irvington, N.J.

Application November 16, 1956, Serial No. 622,688

1 Claim. (Cl. 222—481)

This invention relates to a device for dispensing liquids from a large bottle or similar dispensing container and refers more particularly to an automatic liquid dispensing device provided with a removable pin.

In order to transfer costly liquids from one large container into a smaller bottle such as an eye drop bottle and the like, vast amounts of previous liquid were previously wasted due to inaccurate measurement facilities. Consequently, the cost of the finished product to the consumer was more than the actual manufacturing cost. Furthermore, prior art constructions were not adapted for use with dispenser bottles of varying height. The dispensing device of the present invention has a greater degree of adaptability and versatility due to a novel structural feature of a removable pin. Another advantage of the present invention is that the flow rate of the dispensed liquid is controlled at will by proper manipulation of the dispensing bottle during its inversion.

It is an object of the present invention to provide a liquid dispensing device that is readily adjustable to varying heights of transfer bottles or other similar containers such as an eye drop bottle.

A further object is to provide greater accuracy of measurement during transfer of costly liquids from one dispensing container to another transfer container.

An additional object of the present invention is to eliminate waste of precious liquids during dispensing operations.

Still another object is to provide a dispensing unit that conforms to the standard size mouth of large dispensing bottles or other similar containers.

Yet another object is to provide elimination of leaks and evaporation of liquid while the dispensing bottle is allowed to stand partially filled.

Yet a further object is to provide a greater degree of flow rate of the dispensed liquid by proper manipulation of the dispensing bottle during its inversion.

Other objects will become apparent during the course of the following specification.

In the attainment of the aforesaid objectives, the inventive concept of the present invention may be realized through the provision of a liquid dispensing device that is constituted primarily of a knurled cap that may be threaded at both its inner ends to hold correspondingly a barrel member at one end and a sleeve member at an opposite end. The barrel member may be adapted to restrain the vertical movement of a pin assembly during the dispensing operation. The barrel member may be provided with a plurality of liquid outlet ports at its lowermost end. In addition, an air inlet tube may be firmly soldered in a known manner partially at one end to the inner walls of the barrel member. The opposite end of the air vent tube may project into the sleeve member and be capped with an air inlet valve to allow air to enter the dispensing container and to regulate the flow of the dispensing liquid through the liquid outlet ports.

A removable pin may be threaded at one end and secured to the pin assembly. A variety of adjustable pins ranging in a plurality of heights may be used in connection with the liquid dispensing device of the present invention.

A fuller understanding of the present invention may be had by referring to the following description taken in conjunction with the accompanying drawing, showing by way of example a preferred embodiment of the inventive idea.

In the drawings:

Figure 1 is an elevational view in section of the liquid dispenser constituting the present form of the present invention.

Fig. 2 is a cross-sectional view of the lowermost barrel member taken along the line 2—2 as shown in Figure 1.

Figure 3 is a side elevational view of the pin assembly.

Figure 4 is a plan view of the locking portion constituting the pin assembly taken along the line 4—4 as shown in Figure 3.

Figure 5 is a side elevational view of the lower insertable portion or barrel member of the liquid dispenser.

Figure 6 is an enlarged elevational view partly in section of the liquid dispensing device.

Figure 7 is a top view of the sleeve member taken along the line 7—7 as shown in Figure 6.

Figure 8 is a side elevational view of the adjustable removable pins varying in height that are used with the liquid dispensing device of the present invention.

Figure 9 is a transverse section along line 9—9 of Fig. 7.

Referring now in greater detail to the drawing, reference numeral 10 indicates a liquid dispensing device, and like reference numerals indicate like parts. A knurled cap 12 has an inner threaded skirt 28 and a flange 40. The cap 12 is adapted to be screwed upon a standard size bottle or similar dispensing container. A sleeve member 25 and a barrel member 21 constitute, in addition to the knurled cap 12, the liquid dispensing device of the present invention.

The peripheral notches 41a and 41b of the sleeve member 25 (Fig. 2) coincide in flush diametric alignment with the projections 43d and 43b of the barrel member 21 respectively (Fig. 5).

Both inner ends of the knurled cap 12, namely 28 and 29 are threaded. The threaded end 29 is screwed onto the threaded skirt 27 of the barrel member 21 and the lowermost portion 25a of the sleeve member 25 is conveniently held in a firm position by means of the flange 40 of the knurled cap 12.

The barrel sleeve 21 is integrally formed with a skirt 27, and a barrel extension 22 is firmly connected with the barrel member 21. The entire barrel member 21 is cylindrically elongated in shape with an inner cavity 44. The barrel extension 22 has three liquid outlet ports 14a, 14b, and 14c. The air vent tube 19 originates in the barrel member 21 and is soldered in a known manner to the wall of the inner cavity 44 of the barrel member 21. The opposite end 45 of the air vent tube 19 is projected through the opening 46 of the uppermost portion of the sleeve member 25 as shown in Figure 7 and firmly held in position by means of the integrally formed intermediate sleeve member 24 having an opening 24a.

A pin assembly 34 is placed directly through the inner cavity 44 of the liquid dispensing device. The pin assembly 34 is constituted of a locking portion 39, a removable rod 18 and a removable pin 11. As shown in Figure 4, the locking member 39 has a bridge integrally formed about its periphery to engage the air vent tube 19. The arc 49 enables the liquid to flow more freely through the inner cavity 44 to the liquid outlet ports 14a, 14b and 14c. Both ends 39a and 39b of the locking portion 39 as shown in Figure 3 are threaded to receive the adjustably removable threaded pin end 51 and threaded rod end 50, respectively. As shown in Figure 6, the end 11a of the rod 11 projects through the inner cavity 44 of the barrel extension 22 and remains extended in this position during the normal operation of the liquid dispensing device.

The locking portion 39 and the removable pin 11 are adapted for restricted movement within the threaded skirt 27 and the barrel member 21. Similarly, the removable rod 18 and the rod extension 52 are likewise concurrently restrained to vertical movement in synchrony with the removable pin 11.

The removable rod 18 is projected through an opening 48 of the intermediate sleeve member 24 and the rod extension 52 is projected through an opening 47 carried by the uppermost sleeve member 23.

A helical spring 20 is circumjacently disposed around the outer periphery of the removable rod 18. Its outer ends are biased intermediate the locking member 39 and the intermediate sleeve member 24. It will become readily apparent that this construction and arrangement allows the entire pin assembly 34 to immediately extend to its normal position from its retracted position.

An air inlet valve 15 is placed over the uppermost end 45 of the air vent tube 19. The air inlet valve 15 has a rectangular opening 16 machined through opposite cylindrical walls intermediate its ends, and is carried by an integrally formed connector extension 30 at one end of the valve 15 upon the rod extension 52. It will become apparent from this construction that the air inlet valve 15 is actuated simultaneously with the removable rod 18.

Another helical spring 17 is circumjacently disposed around the outer periphery of the rod extension 52 and its ends are biased intermediate the uppermost sleeve member 23 and the connector extension 30.

The cylindrical air inlet valve 15 has a cap 53 that contains a rubber packing to seal the open end 45 of the air inlet tube 19 when the pin assembly 34 is in its normal extended position.

In operation:

In a normal extended position of the pin assembly 34, the air inlet vent 19 is closed by means of the seal packing capped against the end 45 by the air inlet valve 15.

The operator screws the liquid dispensing device onto the mouth of a standard size bottle or other similar container. Upon complete inversion of the bottle the liquid fills the inner cavity of the barrel and sleeve members. When the lowermost end of the removable pin 11 contacts the bottom surface of the glass or other container to be filled, the dispensing bottle is depressed. The vertical movement of the pin assembly causes the air inlet valve to open the air vent tube 19 in order to allow air to enter the bottle through the air inlet port 13. As the air passes into the dispensing bottle, the liquid retained in the inner cavity of the barrel and sleeve members begins to flow through the liquid outlet ports 14a, 14b and 14c until the level of the dispensed liquid reaches the air inlet port 13. At this point the flow automatically stops and the dispensing bottle is allowed to return to its original upright position. The pin assembly, biased by the helical springs 17 and 20, automatically returns the air inlet valve 15 and pin assembly 34 to its extended position. The liquid dispensing device may be allowed to remain on the dispensing bottle indefinitely since the danger of evaporation or dilution is eliminated due to the tight seal formed at the uppermost end 45 of the air vent tube 19 within the bottle.

As indicated in Figure 8, the removable pin 11 may be replaced by any desired size pin depending upon the height of the transfer bottle.

Another advantage of the construction constituting the inventive concept of the present invention is the immediate displacement of liquid which is primarily due to the enlarged diametrical openings within the barrel extension and arched sides 49 of the locking portion 39 of the pin assembly.

Furthermore, another novel structural feature of the present invention is the removable pin 11 and rod 18 that provide for utilization of the same dispensing unit while filling dispensing containers of varying height. It will become readily apparent that this construction eliminates the necessity of manufacturing a plurality of similar dispensing units.

The present construction reduces the number of expendable parts to a minimum; hence, its maintenance is an added economical feature which is greatly desirable.

It will be understood further that the present invention is not limited to the exact disclosure herein described but may lend itself to a variety of expressions within the scope of the appended claim.

What is claimed is:

A liquid dispensing device, comprising a cap adapted to close a container and having an inner flange and an inner threaded portion, a sleeve member having a portion engaging said flange, an elongated barrel member having an outer threaded portion engaging said inner threaded portion of the cap, said sleeve member and said barrel member being located on opposite ends of said cap, a barrel extension constituting a continuation of said barrel member and firmly connected therewith, said barrel extension having at least one liquid outlet port at the outer end thereof and said barrel member having an air vent, an air vent tube communicating with said air vent and extending through said barrel member, said cap and said sleeve member, a pin assembly comprising a locking member located within said sleeve member, a rod having an end connected with one side of said locking member, said locking member having a threaded hole upon the other side thereof, said rod extending through said barrel member, and having an outer threaded end, a removable and replaceable variable-size pin having an end connected to said outer threaded end of said rod, the other end of said pin extending through said barrel extension, another rod connected with said threaded hole of the locking member, and a resilient air valve operatively connected with said other rod for closing and opening said air vent tube when said pin is actuated.

References Cited in the file of this patent

UNITED STATES PATENTS

| | | |
|---|---|---|
| 1,305,476 | McCord | June 3, 1919 |
| 2,482,867 | Picut | Sept. 27, 1949 |